(12) United States Patent
Boujut-Burgun et al.

(10) Patent No.: US 10,750,141 B2
(45) Date of Patent: Aug. 18, 2020

(54) AUTOMATIC CALIBRATION PROJECTION SYSTEM AND METHOD

(71) Applicant: RÉALISATIONS INC. MONTREAL, Montreal (CA)

(72) Inventors: Hugo Boujut-Burgun, Blainville (CA); Daniel Labonté, Sawyerville (CA); Sébastien Rompré, Blainville (CA)

(73) Assignee: RÉALISATIONS INC. MONTRÉAL (CA)

( * ) Notice: Subject to any disclaimer, the term of this patent is extended or adjusted under 35 U.S.C. 154(b) by 0 days.

(21) Appl. No.: 16/463,233

(22) PCT Filed: Nov. 20, 2017

(86) PCT No.: PCT/CA2017/051382
§ 371 (c)(1),
(2) Date: May 22, 2019

(87) PCT Pub. No.: WO2018/094513
PCT Pub. Date: May 31, 2018

(65) Prior Publication Data
US 2019/0313070 A1 Oct. 10, 2019

Related U.S. Application Data

(60) Provisional application No. 62/425,947, filed on Nov. 23, 2016.

(51) Int. Cl.
*H04N 9/31* (2006.01)
*G06T 7/80* (2017.01)
(Continued)

(52) U.S. Cl.
CPC .......... *H04N 9/3185* (2013.01); *G06F 3/011* (2013.01); *G06T 1/20* (2013.01); *G06T 7/70* (2017.01);
(Continued)

(58) Field of Classification Search
CPC .................. H04N 9/3147; G06T 7/80
See application file for complete search history.

(56) References Cited

U.S. PATENT DOCUMENTS

| 6,337,306 B1 | 1/2002 | Sasaki et al. |
| 6,456,339 B1 * | 9/2002 | Surati .................. G03B 37/04 348/744 |

(Continued)

OTHER PUBLICATIONS

Billot, A., Gilboa, I., Schmeidler, D., "Axiomatization of an Exponential Similarity Function," Mathematical Social Sciences, vol. 55, Issue 2, pp. 107-115, (2008).

(Continued)

*Primary Examiner* — Paulos M Natnael
(74) *Attorney, Agent, or Firm* — Lavery, De Billy, LLP; Gonzalo Lavin

(57) ABSTRACT

A method for automatically calibrating a system of projectors for displaying images, the method comprising the steps of selectively projecting pixels from a projector onto a projection surface, sensing the pixels as projected across the projection surface deriving a projector/screen mapping based on the selectively projected pixels and the sensed pixels, deriving a pixel correction function based on the projector/screen mapping, storing the pixel correction function by applying a texture map to a mapping mesh inside a graphical pipeline of a graphics processor unit (GPU), applying the pixel correction function to input image pixel data to produce corrected pixel data which corrects at least for misalignment, and driving the projector with the corrected pixel data.

15 Claims, 7 Drawing Sheets

(51) Int. Cl.
*G06T 7/70* (2017.01)
*G06F 3/01* (2006.01)
*G06T 1/20* (2006.01)
*H04N 17/00* (2006.01)

(52) U.S. Cl.
CPC ............... *G06T 7/80* (2017.01); *H04N 9/31* (2013.01); *H04N 9/3147* (2013.01); *H04N 9/3182* (2013.01); *H04N 9/3191* (2013.01); *H04N 9/3194* (2013.01); *H04N 17/00* (2013.01); *G06T 2207/30204* (2013.01)

(56) References Cited

U.S. PATENT DOCUMENTS

| | | |
|---|---|---|
| 6,525,772 B2 | 2/2003 | Johnson et al. |
| 6,618,076 B1 | 9/2003 | Sukthankar et al. |
| 7,038,727 B2 | 5/2006 | Majumder et al. |
| 7,306,341 B2 | 12/2007 | Chang |
| 7,893,393 B2 | 2/2011 | Webb et al. |
| 8,777,418 B2 | 7/2014 | Wright et al. |
| 9,195,121 B2 | 11/2015 | Sajadi et al. |
| 9,369,683 B2 | 6/2016 | Timoner et al. |
| 2008/0192017 A1 | 8/2008 | Hildebrandt et al. |
| 2008/0246781 A1* | 10/2008 | Surati ............ H04N 5/74 345/690 |
| 2012/0098937 A1 | 4/2012 | Sajadi et al. |
| 2015/0177906 A1* | 6/2015 | Yairi ............ G06T 3/0006 345/648 |
| 2015/0281661 A1* | 10/2015 | Surati ............ H04N 5/74 345/694 |

OTHER PUBLICATIONS

Brown, M.S., Seales, W.B., "A Practical and Flexible Tiled Display System," in proceeding 10th Pacific Conference on Computer Graphics and Applications, (2002).

Harville, M., Culbertson, B. Sobel, I., Gelc, D., Filzhugh, A., Tanguay, D., "Practical Methods for Geometric and Photometric Correction of Tiled Projector Displays on Curved Surfaces," Conference on Computer Vision and Pattern Recognition Workshop (2006).

International Search Report and Written Opinion.

Pagani, A., Strieker, D., "Spatially uniform colors for projectors and tiled displays," Journal of the Society for Information Display, vol. 15, No. 9, pp. 679-689 (2007).

* cited by examiner

AUTOMATIC CALIBRATION PROJECTION SYSTEM AND METHOD

This application is a National Phase Entry of PCT application Serial No. PCT/CA2017/051382 filed on Nov. 20, 2017 and published in English under PCT Article 21(2), which itself claims benefit of U.S. provisional application Ser. No. 62/425,947, filed Nov. 23, 2016. All documents above are incorporated herein in their entirety by reference.

BACKGROUND OF THE INVENTION

The need for very large projection systems like on a building wall or in a large inflatable dome, able to cover a crowd of people and where the projection must be able to project 360 degrees horizontally and 180 degrees vertically, is a big challenge for current projection technology. It is common for such installations to combine overlapping displays from different projectors. In U.S. Pat. Nos. 6,377,306; 6,525,772 Johnson et al. determined that, on a non-lambertian surface, the overlap must be 25% or more. To achieve a quality of rendering, alignment and matching of the projectors, it is mandatory to realize multiple calibration aspects of the system, and it is a time-consuming task, even for experienced personnel.

For a group of projectors to achieve a single seamless, uniform, and larger image, precisely positioned on projection surfaces, there are numerous issues to overcome. The type of corrections generally contemplated herein includes blending imagery correction across projectors so that the total intensity of a region overlapped by multiple projectors is of similar intensity to the rest of the projection surface (Harville, 2006). Further, a geometric calibration (wrap) of the imagery projected to a screen or a complex static surface like building floors, walls and ceilings, or in a temporary one, such as an inflatable dome, must to be done. For manual geometric calibration, the state of the art generally involves the application of substantial precision, which is tedious to achieve. In U.S. Pat. No. 8,777,418, Wright et al. presented an automatic calibration method, but this method requires multiple iterations to operate and requires markers on the screen. In U.S. Pat. No. 9,369,683, Timoner et al. presented both manual and semi-automatic calibration methods using markers.

Projection-based displays suffer from geometric distortions, sometimes on a per-color channel often as a result of imperfect optics of projectors. They also suffer from intensity variations within and across projectors, color sheens, color mismatches across projectors, varying black levels, different input-output curves, etc. The usage of different kinds of projectors or combining old projectors with brand new ones in a multiple projector configuration can produce significant intensity and color disparity on the projection surface. In U.S. Pat. No. 7,038,727, Majumder et al. presented a method to correct intensity variations across projectors.

Color and intensity changes both across projectors and also specifically for each unit must be corrected in order to achieve compensation for the use of multiple units of projection (Pagani, 2007). In U.S. Pat. No. 6,456,339, Surati et al. disclosed the use of cameras and image processing via a pixel correction function and a lookup table to simplify the aligning and matching processes of projectors by providing, after processing, modified images with altered geometry, color and brightness. The use of one or an array of optical sensors, such as calibrated color cameras, to obtain feedback from each projector's projected pixels allows for registering, calibrating and correcting each of the projected pixels to achieve a single seamless, uniform and calibrated image on the projection surface. Methods for calibrating (registration, blending, intensity, color) multiple projector systems to produce a seamless single image with high quality reproduction of color, uniformity and intensity exist, but some manual or semi-manual operation must be done to complete the process. This is particularly problematic for installations that have to be moved and re-installed rapidly, such as with an itinerant projection in a dome where multiple projection shows are provided one after the other. If an element of the projection system (projector, camera, lens, etc.) is changed, moved or just slightly unaligned, a recalibration must be done rapidly between two shows.

During the calibration process, environmental conditions or interferences can produce detected points that are wrong or mislabeled, making calibration impossible without human intervention to manually correct the problem or to reinitiate the calibration process. In U.S. Pat. No. 7,893,393, Webb et al. presented a method for such detected wrong or mislabeled points, but this method requires the parametric surface's equation to operate.

In order to address the above drawbacks, a desired method should provide a quick automatic calibration function including morphing, blending, color, brightness and precise positioning of the corrected composite image on the projection surface to be performed after casual or routine projector and camera placement or changes.

The following US patents disclose other systems that are related to the present invention: U.S. Pat. No. 6,618,076, Sukthankar et al.; U.S. Pat. No. 7,306,341, Chang; and U.S. Pat. No. 9,195,121, Sajadi et al.

OTHER REFERENCES

Brown, M. S., Seales, W. B., "A Practical and Flexible Tiled Display System," in proceeding 10th Pacific Conference on Computer Graphics and Applications, (2002).
Harville, M., Culbertson, B. Sobel, I., Gelc, D., Fitzhugh, A., Tanguay, D., "Practical Methods for Geometric and Photometric Correction of Tiled Projector Displays on Curved Surfaces," Conference on Computer Vision and Pattern Recognition Workshop (2006).
Pagani, A., Stricker, D., "Spatially uniform colors for projectors and tiled displays," Journal of the Society for Information Display, Vol. 15, no. 9, pp. 679-689 (2007)
Billot, A., Gilboa, I., Schmeidler, D., "Axiomatization of an Exponential Similarity Function," Mathematical Social Sciences, Vol. 55, Issue 2, pp. 107-115, (2008).

SUMMARY OF THE INVENTION

In one aspect, the present invention overcomes disadvantages of the prior art for manual or semi-manual calibration and positioning of a multiple 2D projectors composed image by integrating the entire calibration process required to produce a seamless single image that is well positioned on the projection surface. The positioning of the image is achieved through the use of active light emitting diode (LED) visual tag on the projection surface.

According to the present invention, there is provided a system and method for automatically calibrating and positioning a seamless image from multiple 2D video projectors. The process may be subdivided into three sub-processes. A first sub-process concerns the calibration of a camera/projector system by registering the pixels of the projectors with the pixels of at least one camera. The proposed method of registration includes a novel consistency check of the projected calibration test pattern to remove detected wrong or mislabeled points with a machine learning algorithm to provide a more robust calibration process than in the prior art and without needing the surface's equation. This first sub-process is to be repeated every time one or more projectors have been moved or when one or more cameras have been displaced.

A second sub-process concerns the calibration of a camera with the projection surface by registering the position of LED active markers with reference to the pixels of each camera. Each LED marker is associated with a coordinate of the final image to be displayed by the projectors. Thus, the geometry of the final image will depend on the position of the LED markers and their activation sequence. This second sub-process is to be repeated only if at least one camera or LED marker has been displaced.

A third sub-process concerns the application of the mapping and blending parameters to the pixels of the projectors for altering the pixel matrix of the pixels of the projectors and the brightness of the pixels to give the impression that the whole of the projectors is only a single projector. The modification of the matrix of the pixels and the brightness of the pixels is achieved by collecting information during the first two calibration steps or sub-processes. The mapping and blending is realized by applying a texture map to a mapping mesh inside the graphical pipeline of a graphics processing unit (GPU), which is faster than other known methods, such as by using a pixels correspondence table which requires additional recalculation to correct the blending parameters or to modify the geometry of the final image in real time. The additional time needed for these recalculation steps increases based on the number of projectors being used and the required image resolution. Also, a white balance is done before a geometric color blending in order to get a better color uniformity than other known methods, such as gamut blending which focus on preserving the white balance among the projectors.

The mapping and blending method proposed by the present invention is based on a "geometric warp" and only requires two passes. During the first pass, the image to be corrected is rendered or warped onto the mesh. The coordinates of each vertex of the mesh correspond to the coordinates of the structured light points projected during calibration. Each vertex of the mesh has two associated UV coordinates. These are the coordinates in the repository of the image to be corrected. Each vertex of the mesh is associated to a point in the image to be corrected. These UV coordinates correspond to the detected positions of the structured light points on the sensor of the calibration camera. The image warping is done in real-time and is optimized for extremely high resolutions. Thus, it is entirely possible to use the present invention to modify in real-time the geometry of the final image by simply modifying the UV coordinates, which requires no additional recalculations of look-up tables, as is necessary with such previous methods. Unlike in previous methods where blending took place during a second pass with anti-aliasing filtering, the present invention implements blending in the fragment shader concurrently with geometric correcting of pixels, thus requiring less calculation time.

According to the present invention, there is provided a method for automatically calibrating a system of projectors for displaying images, the method comprising the steps of selectively projecting pixels from a projector onto a projection surface, sensing the pixels as projected across the projection surface deriving a projector/screen mapping based on the selectively projected pixels and the sensed pixels, deriving a pixel correction function based on the projector/screen mapping, storing the pixel correction function by applying a texture map to a mapping mesh inside a graphical pipeline of a graphics processor unit (GPU), applying the pixel correction function to input image pixel data to produce corrected pixel data which corrects at least for misalignment, and driving the projector with the corrected pixel data.

In embodiments, the pixel correction function corrects for misalignment of plural projections in a common region.

In embodiments, the pixel correction function corrects for intensity variations across a projected image.

In embodiments, the pixel correction function corrects for imperfections across a projected image.

In embodiments, the pixel correction function corrects for chromatic aberration.

In embodiments, the pixel correction function corrects for rotational distortion.

In embodiments, the pixel correction function performs smooth warping of the input image.

In embodiments, the texture map is applied to the mapping mesh inside the graphical pipeline of the graphics processor unit (GPU) such that the pixel correction function is applied to the pixel data between the graphical pipeline and the projector.

In embodiments, the texture map is applied to the mapping mesh inside the graphical pipeline of the graphics processor unit (GPU) such that the projector is driven from the corrected pixel data in the graphical pipeline.

In embodiments, a plurality of projectors is provided, each of the projectors comprising a portion of the texture map in each of the projectors' the graphical pipeline.

In embodiments, the pixel correction function corrects for misalignment of overlapping pixel array.

In embodiments, the pixel correction function blends overlapping projection regions.

In embodiments, a separate texture map is provided for each plural color.

In embodiments, the projector output is sensed by an optical sensor that is displaced from the projection surface.

In embodiments, the optical sensor comprises at least one camera.

In embodiments, the step of deriving the projector/screen mapping comprises the steps of deriving a sensor/screen mapping, deriving a projector/sensor mapping, and deriving the projector/screen mapping by composing the sensor/screen mapping with the projector/sensor mapping.

In embodiments, the step of deriving the sensor/screen mapping comprises the steps of projecting a calibration pattern at the projection surface, and creating a mapping between pixels in sensor space and projection surface positions by viewing the projected calibration pattern with the optical sensor.

In embodiments, the step of deriving the projector/sensor mapping comprises the step of selectively driving projector pixels while sensing the projector output.

In embodiments, the projector output is projected onto a flat surface.

In embodiments, the projector output is projected onto a curved surface.

In an embodiment, the projector output is projected onto an irregular surface.

In an embodiment, the method further comprises the steps of measuring a position of a viewer and performing real-time parallax correction to image pixel data responsive to the viewer's position.

In an embodiment, the method further comprises the step of providing a different image for each of the viewer's eyes.

In an embodiment, the method further comprises the step of providing frame triggered shutters for each of the viewer's eyes.

In an embodiment, the method further comprises the step of providing projected polarization control.

In an embodiment, the method further comprises the step of providing red/blue colored glasses.

In an embodiment, the method further comprises the steps of projecting plural colors and using distinct narrow band color filters for each of the viewer's eyes.

There is also provided a system for automatically calibrating a set of projectors for displaying images, the system comprising a projector for projecting a projector output on a projection surface, at least one sensor for sensing the projector output as projected across the projection surface, the at least one sensor being displaceable with respect to the projection surface, at least two active LED markers for sensing the position on the projection surface of a final image to display, and at least one processor configured for determining a projector/screen mapping by selectively driving projector pixels and reading the sensed projector output from the at least one sensor and applying a pixel correction function to input image pixel data to correct at least for misalignment, the at least one processor driving the projector with the corrected pixel data, the pixel correction function mapping between projector coordinate space and screen coordinate space based on the projector/screen mapping.

In an embodiment, the at least two active LED markers sense the correct position on the projection surface of the final image to display by turning on in sequence the at least two LED markers, deriving a sensor/markers positions, deriving a markers/image mapping, and composing the sensor/markers positions with the markers/image mapping.

There is also provided a method for automatically calibrating a system of projectors for displaying images, the method comprising the steps of selectively projecting pixels from a projector onto a projection surface, sensing the pixels as projected across the projection surface, removing detected wrong or mislabeled structured light encoded points, deriving a projector/screen mapping based on the selectively projected pixels and the sensed pixels, deriving a pixel correction function based on the projector/screen mapping, storing the pixel correction function, applying the pixel correction function to input image pixel data to produce corrected pixel data which corrects at least for misalignment, and driving the projector with the corrected pixel data.

In an embodiment, the detected wrong or mislabeled structured light encoded points are removed by means of a machine learning process.

In an embodiment, the step of removing detected wrong or mislabeled structured light encoded points comprises the steps of projecting selectively calibration pattern pixels from the projector onto the projection surface sensing said pattern pixels as projected across the projection surface detecting wrong or mislabeled structured light encoded points by means of a machine learning process, and correcting or eliminating wrong or mislabeled calibration pattern points in the detected calibration pattern.

DETAILED DESCRIPTION OF THE ILLUSTRATIVE EMBODIMENTS

Figure 1A:
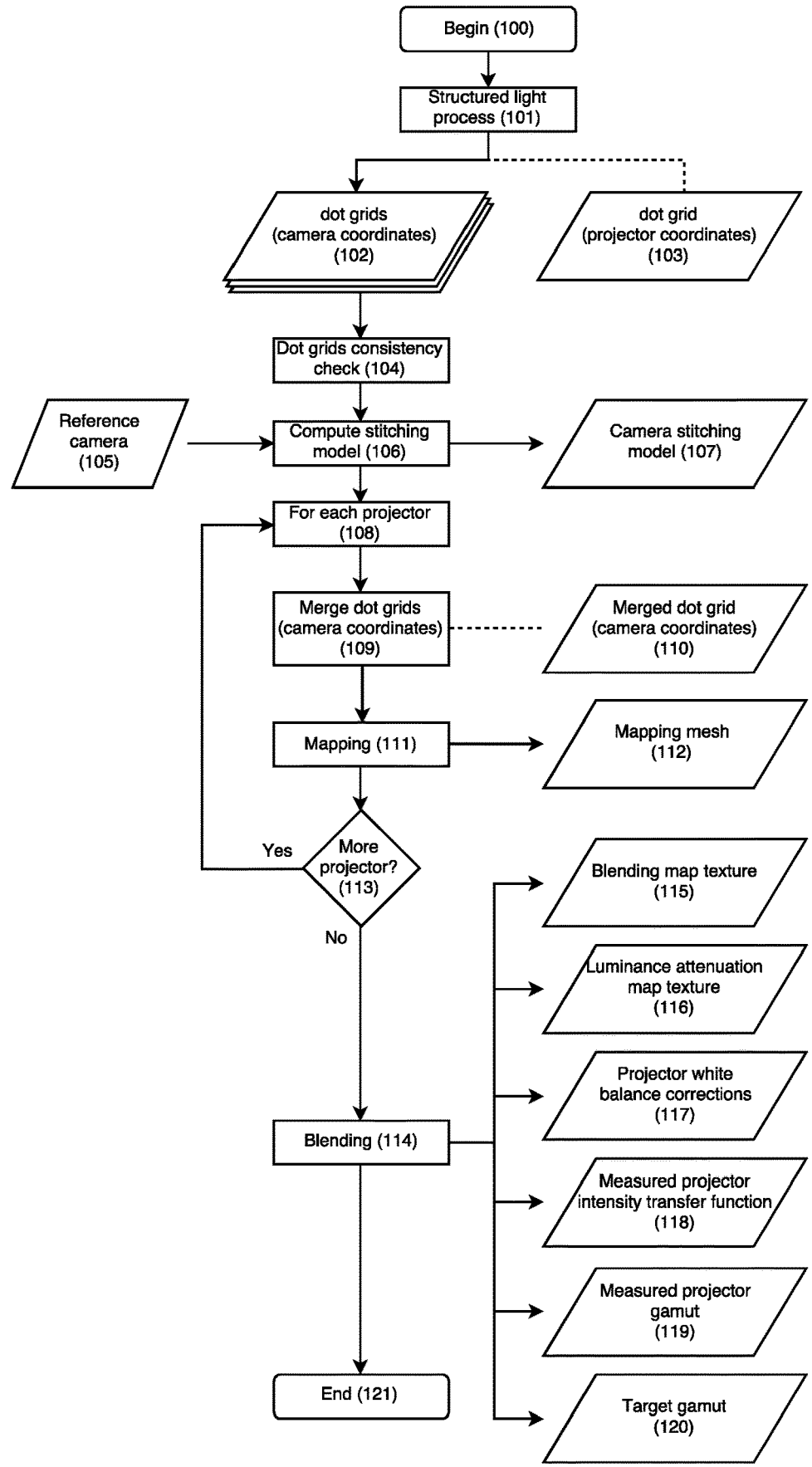
FIG. 1A is block a diagram of a camera/projector registration algorithm, in accordance with an illustrative embodiment of the present invention.

Referring to FIG. 1A, there is shown a block diagram of a projector registration process. It starts at "Begin" block 100, which initiates the process of registering of projectors. At "Structured light process" block 101 the process initiates a projection and structured light detection. Regardless of the algorithm used, the goal is to find a known point of reference throughout the projectors pixels (see block 103) in the reference frame pixel of the cameras (see block 102). At "Dot grids (camera coordinates)" block 102 the process uses tables containing the coordinates of points detected by coordinate system of the cameras. There is one table for each pair (camera, projector). If there are N projectors and M cameras, then there are N×M tables. At "Dot grid (projector coordinates)" block 103, the process uses tables containing the coordinates of known points in the coordinate system of the projectors. There is one table for each projector. At "Dot grids consistency check" block 104, the process removes detected wrong or mislabeled points with a machine learning algorithm. Reference camera 105 is used as reference for the stitching. At "Compute stitching model" block 106 the process calculates the stitching model of the cameras with the coordinates of the detected points (see block 102). The output of block 106 is sent to "Camera stitching model" block 107 for storing a model for stitching of the cameras (homography matrices) with respect to the reference camera 105. A homography matrix for each camera is used except for the reference camera 105. At "For each projector" block 108, a loop is started for each projector. At "Merge dot grids (camera coordinates)" block 109, the process merges the points detected by the cameras of a particular projector (see block 102) in the plane of the reference camera 105 with the camera stitching model 107. At "Merged dot grid (camera coordinates)" block 110, the result from block 109 is received. Block 110 includes tables containing the coordinates of points detected by the reference camera 105. There is one table for each projector (at the end of the loop, at block 112). At "Mapping" block 111, a mapping operation of the projectors is carried out. A 2D grid of points is constructed for each projector (see block 112). The grid points are the known points in the coordinate system of the projector (see block 103). The points which have not been detected are removed. Then a Delaunay triangulation is run on this set of points to form the faces of the mesh. The texture UV coordinates associated with each mesh point are the coordinates of this point in the coordinate system of the reference camera (see block 110). At "Mapping mesh" block 112, the process result of block 110 that is obtained is a 2D mesh of points containing the information necessary for mapping a projector. There are as many 2D meshes as projectors at the end of the loop. At "More projector" block 113, the process verifies whether there are any more projectors and returns to block 108 if so. Otherwise, the process continues to the "Blending" block 114 to proceed with blending operations of the projectors. With the information obtained from blocks 103 and 110, the overlaps between the projectors are modeled. It is thus possible to create a geometric blending image for each projector, wherein each pixel of the image determines the light intensity of the corresponding pixel of the projector. By measuring the trichromacy of the projector with the camera, the white balance and the color gamut ("Measured projector gamut" block 119) of the projector can be calculated. The corrections to the white balance are calculated at "Projector white balance corrections" block 117 and the geometric blending images are computed at "Blending map texture" block 115. The brightness of the white point of each projector is measured at different levels of intensity to build the projector's intensity transfer function at "Measured projector intensity transfer function" block 118. Measuring the maximum intensity of each pixel of each projector is used to calculate a brightness attenuation image, wherein each pixel of the image corresponds to the attenuation level of the brightness of a pixel of the projector at "Luminance attenuation map texture" block 116. The attenuation of the pixel is calculated according to the maximum intensity level of the lowest pixel in the set of projectors. The "Target gamut" at block 120 defines the common achievable color gamut of the projector set. It is computed using the entire "Measured projector gamut" at block 119. At "Blending map texture" block 115 the process uses an image for each projector of the resolution of the projector. Each pixel of the image determines the brightness of the pixel that corresponds to the projector. At "Luminance attenuation map texture" block 116 the process uses an image for each projector of the resolution of the projector. Each pixel of the image determines the attenuation of the brightness of the pixel that corresponds to the projector. At "Projector white balance corrections" block 117 the process uses three coefficients for each projector: one for the red level, one for green level and one for the blue level. "Measured projector intensity transfer function" block 118 uses a table to store the projector luminance response with regard to a luminance input value. "Measure projector gamut" block 119 uses five colorimetric measurements in the CIE-XYZ color space to characterize the projector gamut and intensity: one for the red, one for the green, one for the blue, one for the black and one for the white. "Target gamut" block 120 uses a set of CIE-xy values with associated gains to characterize the gamut of the common achievable target color space. CIE-xy values are the same for all the projectors, except for gain values which may be different for each projector.

Figure 1B:
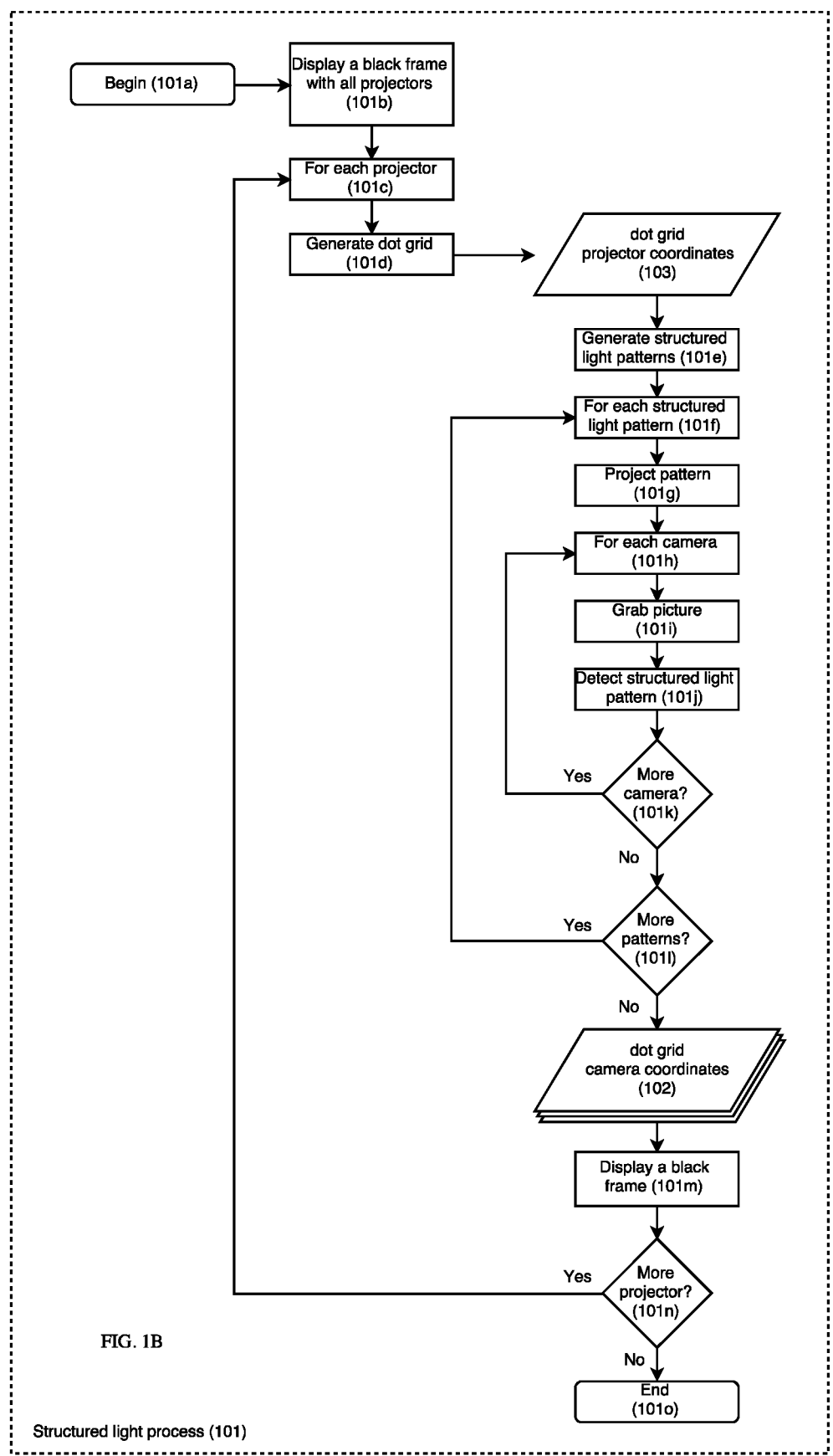
FIG. 1B is a block diagram of a structured light process, in accordance with an illustrative embodiment of the present invention.

Referring to FIG. 1B, there is illustrated a structured light process 101 (also shown in FIG. 1A), in accordance with an illustrative embodiment of the present invention. The process for generating and detecting structured light begins at "Begin" step 101a with a first step of "Displaying a black frame with all projectors" 101b. The process continues at step 101c with iteration "For each projector" at step 101c. The process continues at "Generate dot grid" step 101d by generating a dot grid in the markings of the pixels of the projector. The process continues at "Dot grid projector coordinates" block 103 (see FIG. 1A). The process continues at "Generate structured light patterns" step 101e by generating structured light patterns in order to encode the dot grid. The process continues at "For each structured light pattern" step 101f by iterating for each structured light pattern the following steps. The process continues at step at "Project pattern" step 101g by projecting a pattern on the projector. The process continues at "For each camera" step 101h by iterating for each camera the following steps. The process continues at "Grab picture" step 101i by grabbing a picture with a camera. The process continues at "Detect structured light pattern" step 101j by detecting structured light pattern with the camera. The process continues at "More camera?" block 101k by verifying whether there are more cameras or not. If yes, the process loops back to step 101h. If not, the process continues to "More patterns?" block 101l by verifying whether there are more patterns or not. If yes, the process loops back to step 101f. If not, the process continues to "Dot grid camera coordinates" block 102 (see FIG. 1A). The process continues at "Display a black frame" step 101m by displaying a black frame on the projector. The process continues at "More projector?" block 101n by verifying whether or not there are more projectors. If yes, the process loops back to step 101c. If not, the process for generating and detecting structured light ends at "End" step 1010.

Figures 2A, 2B:
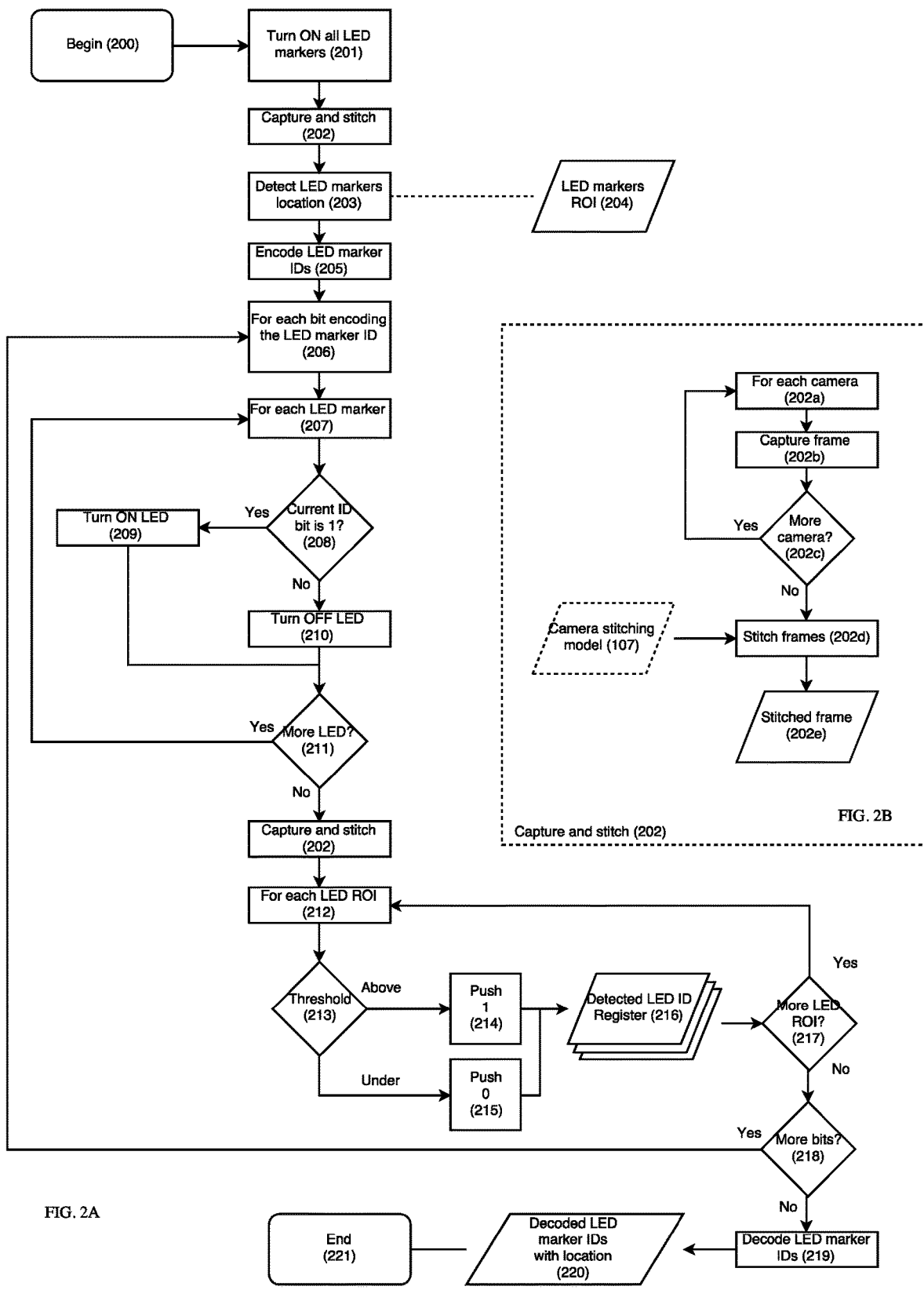
FIGS. 2A, 2B, 2C, and 2D are block diagrams of LED markers registration processes, in accordance with an illustrative embodiment of the present invention.

Referring to FIG. 2A, there is illustrated a block diagram of an LED markers registration process in the coordinate system of reference camera 105 (see FIG. 1A), in accordance with an illustrative embodiment of the present invention. The process begins at "Begin" step 200 at the "Turn ON all LED markers" step 201. The process continues at "Capture and stitch" step 202 by capturing an image with each camera and applying a stitching model 107 (see FIG. 1A) for obtaining a single image from the point of view of the reference camera 105 (see FIG. 1A). The process continues at "Detect LED markers location" step 203 by detecting the position of each LED marker on the image captured at step 202. The position of the LED markers is presented as a region of interest (ROI) at "LED markers ROI" block 204. At this stage of the process there may be false positives and false negatives. "LED markers ROI" block 204 receives the results of step 203, which is the position of each LED marker on the image captures at step 202. The process continues at "Encode LED marker IDs" step 205 by encoding the LED markers IDs that will be eventually transmitted via light signals. The process continues at "For each bit encoding the LED marker ID" step 206 by iterating for each bit encoding the LED marker ID identified in step 205. The process continues at "For each LED marker" step 207 by iterating for each LED marker. The process continues at "Current ID bit is 1?" block 208 by verifying whether the current ID bit is 1. If yes, the process continues at "Turn ON LED" step 209 by turning ON the LED marker. If not, the process continues at "Turn OFF LED" step 210 by turning OFF the LED marker. The process continues at "More LED? block 211 by verifying whether there are more LED markers or not. If yes, the process loops back to step 207. If not, the process continues to "Capture and stitch" step 202. The process continues at "For each LED ROI" step 212 by iterating for each LED marker in the ROI. The process continues at "Threshold" block 213 by verifying whether a ratio of white pixels versus black pixels in the ROI is above or under a threshold. If above the threshold, the process continues at "Push 1" step 214 by pushing bit 1 to the LED marker ID register in step 212. If below the threshold, the process continues at "Push 0" step 215 by pushing bit 0 to the LED marker ID register in step 212. The process continues at "Detected LED ID register" block 216 by storing in registers the bits detected during the transmission of the LED markers IDs. There is a register for each region of interest (ROI) corresponding to block 204. The process continues at "More LED ROI?" block 217 by verifying whether there are more LED markers in the ROI. If yes, the process loops back to step 212. If not, the process continues to "More bits?" block 218 by verifying whether there are more bits or not. If yes, the process loops back to step 206. If not, the process continues to "Decode LED marker IDs" step 219 by decoding the LED markers IDs. The ROI's with unlikely or implausible ID's are eliminated. The process continues at "Decoded LED markers with IDs with location" block 220, which receives the result of step 219 that includes the location of the LED markers (at the center of the corresponding region of interest). The process for registering the LED markers ends at "End" step 221.

Referring now to FIG. 2B, there is illustrated a "Capture and stitch process" 202, in accordance with an embodiment of the present invention. The process begins at "For each camera" step 202a by iterating for each camera the following steps. The process continues at "Capture frame" step 202b by capturing an image with the camera with the current iteration. The process continues at "More camera?" block 202c by verifying whether there are more cameras or not. If yes, the process loops back to step 202a. If not, the process continues at "Stitch frames" step 202d by applying the stitching model 107 (see FIG. 1A) to the captured images from step 202b to obtain a single image from the point of view of the reference camera 105 (see FIG. 1A). The process continues at "Stitched frame" block 202e, which receives the result of step 202d.

Figure 2C:
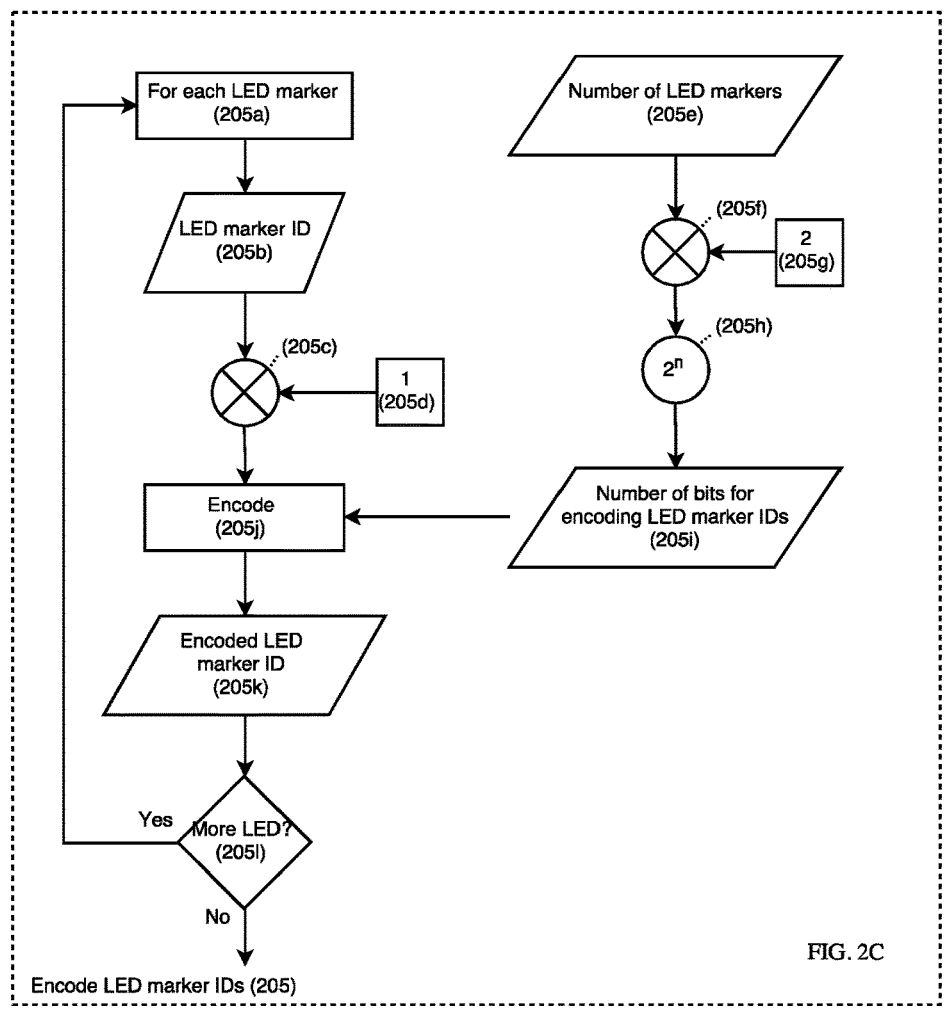

Referring now to FIG. 2C, there is illustrated an "Encode LED marker IDs" process 205, in accordance with an embodiment of the present invention. The process begins at "For each LED marker" step 205a by iterating for each LED marker the following steps. The process continues at "LED marker ID" step 205b by identifying the LED marker ID. The process continues at step 205c by incrementing the LED marker ID by 1 via "1" block 205d. The process continues in parallel at "Number or LED markers" block 205e with the number of LED markers used for the calibration. The process continues at step 205f by incrementing the number of LED markers by 2 via "2" block 205g. The process continues at "2^n" step 205h by calculating the number of bits that are necessary for encoding the result of step 205f. The process continues at "Number of bits for encoding LED marker IDs" step 205i by receiving the result of step 205h. The process continues at "Encode" step 205j by encoding the result from step 205c with the number of bits determined by step 205i. The process continues at "Encoded LED marker ID" block 205k, which receives the result of step 205j and stores the encoded LED marker ID. The process continues at "More LED?" block 205l by verifying whether there are more LED markers. If yes, the process loops back to step 205a. If not, the process continues to step 206 (see FIG. 2A).

Figure 2D:
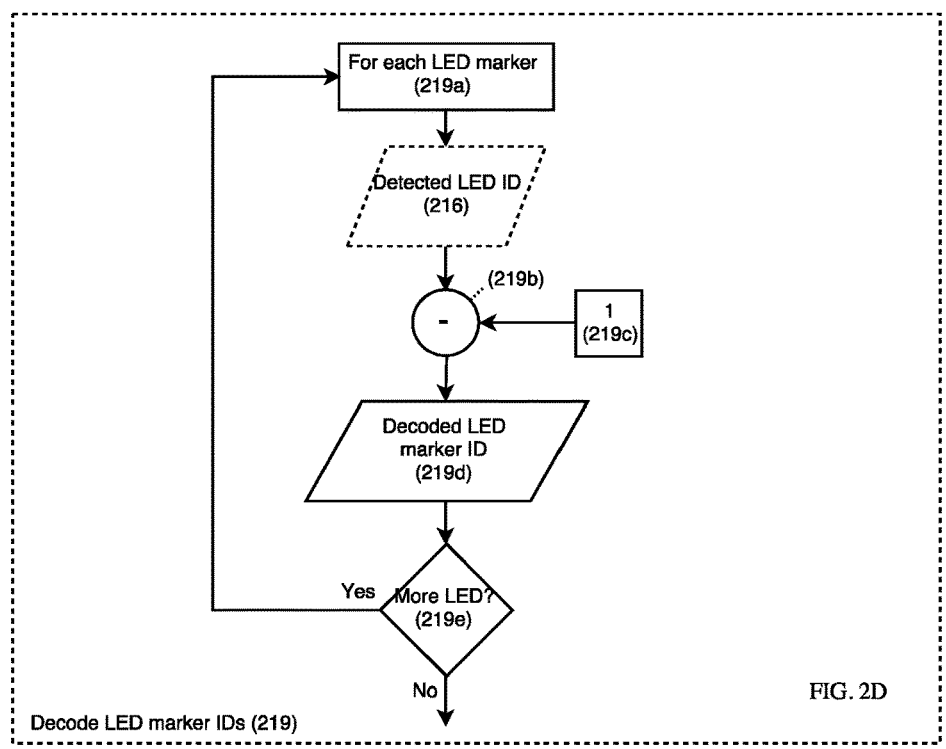

Referring now to FIG. 2D, there is illustrated a "Decode LED marker IDs" process 219, in accordance with an embodiment of the present invention. The process begins at "For each LED marker" step 219a by iterating for each LED marker the following steps. The process continues at "Detected LED ID Register" block 216 (see FIG. 2A). The process continues at step 219b by decrementing by 1 the number of LED markers obtained from step 205b via "1" block 219c. The process continues at "Decoded LED marker ID" step 219d, which receives the result of step 219b and stores the decoded LED marker ID. The process continues at "More LED?" block 219e by verifying whether there are more LED markers. If yes, the process loops back to step 219a. If not, the process continues to step 220 (see FIG. 2A).

Figure 3:
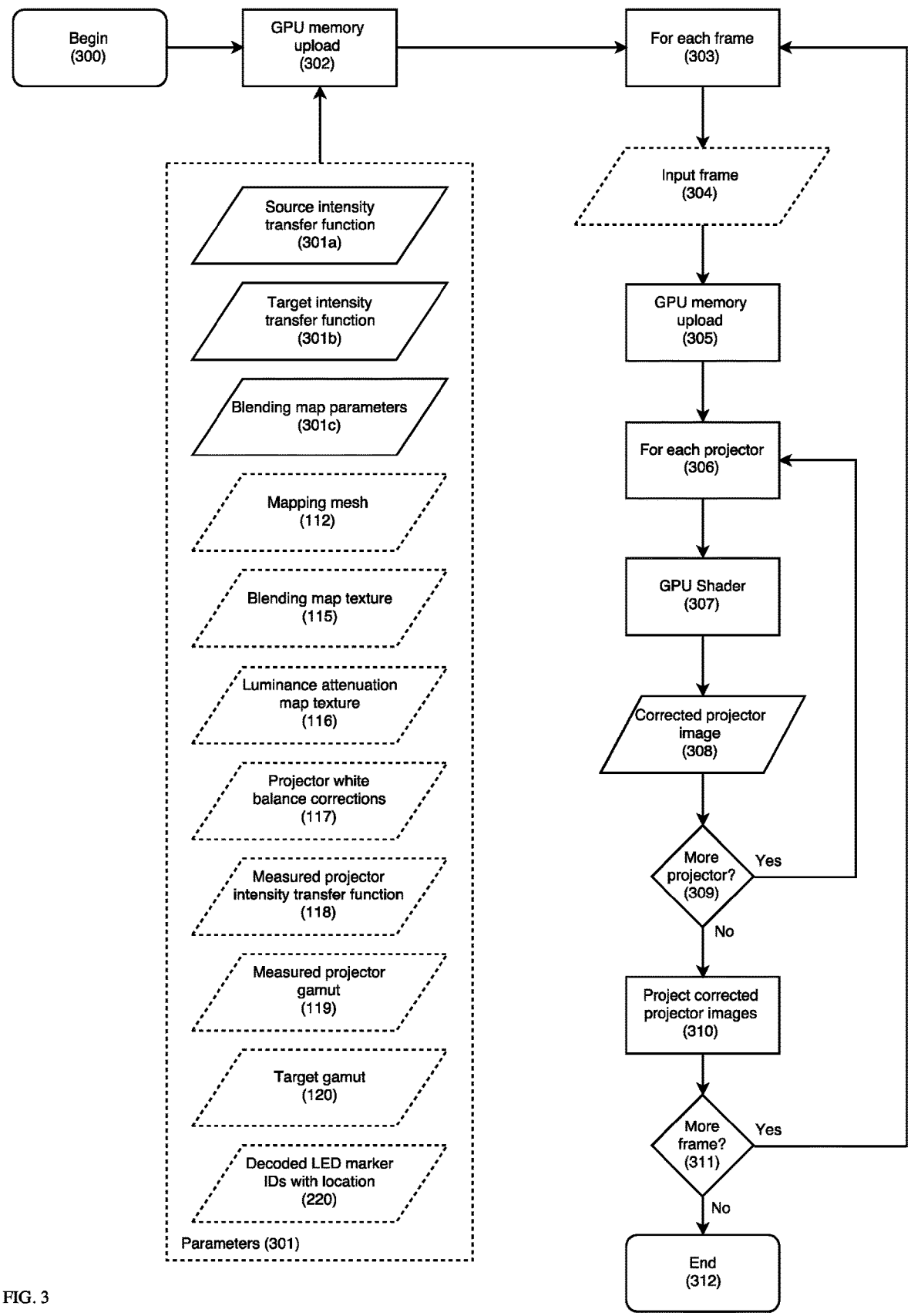
FIG. 3 is a block diagram of a projector correction process, in accordance with an illustrative embodiment of the present invention.

Referring to FIG. 3, there is illustrated a projector correction process, in accordance with an illustrative embodiment of the present invention. The process begins at "Begin" step 300 by obtaining as an input the parameters necessary to the correction of the images of the processors. The parameters 301 may be obtained from a source function at "Source intensity transfer function" block 301a, which is the inverse function of an intensity transfer function applied to the input frames. The parameters 301 may be obtained from "Target intensity transfer function" block 301b, which is an intensity transfer function that is to be applied to the corrected frames. The parameters 301 may be obtained from "Blending map parameters" block 301c, which are parameters applied to the blending images of the projectors 115 (see FIG. 1A). The parameters 301 may be obtained from "Measured projector intensity transfer function" block 118, "Measured projector gamut" block 119, "Target gamut" block 120, "Projector white balance corrections" block 117, "Mapping mesh" block 112, "Blending map texture" block 115, "Luminance attenuation" block 116, and "Decoded LED marker IDs with location" block 220. The process continues at "GPU memory upload" block 302, which receives the parameters 301 as input and stores in a graphic card the correction parameters. The process continues at "For each frame" step 303 by iterating for each frame the following steps. The process continues at "Input frame" block 304, which is an input frame to correct. The process continues at "GPU memory upload" block 305, which stores the frame to correct from block 304. This step is optional as the frame to correct may already have been stored in the graphic card. The process continues at "For each projector" step 306 by iterating for each projector the following steps. The process continues at "GPU Shader" block 307, which is a program installed in the graphic card for correcting the frames of a projector. The process continues at "Corrected projector image" block 308, which receives the corrected frame for the projector. The process continues at "More projectors?" block 309 by verifying whether there are more projectors. If yes, the process loops back to step 306. If not, the process continues to "Project corrected projector images" step 310 by projecting the corrected projector images on the projectors. The process continues at "More frame?" block 311 by verifying whether there are more frames or not. If yes, the process loops back to step 306. If not, the process ends at "End" step 312.

Figure 4:
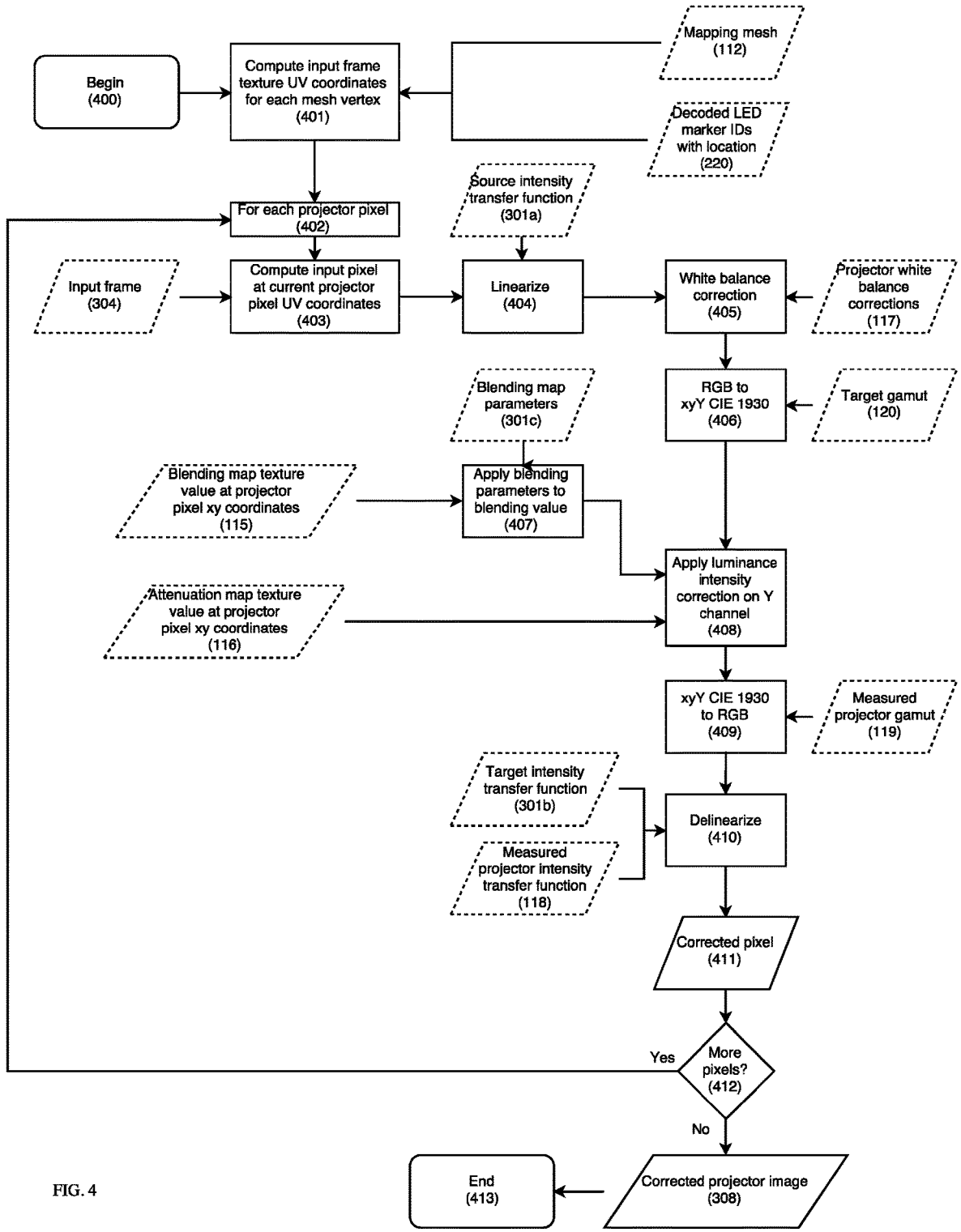
FIG. 4 is block diagram of a GPU Shader for a projection correction process, in accordance with an illustrative embodiment of the present invention.

Referring now to FIG. 4, there is illustrated a GPU Shader for projection correction process that is implemented in the graphic card for correcting the images of the projectors, in accordance with an illustrative embodiment of the present invention. The process begins at "Begin" step 400 with a first step 401 to "Compute input frame texture UV coordinates for each mesh vertex". This step 401 updates the UV coordinates associated to the mapped mesh vertices from "Mapping mesh" block 112 (see FIG. 1A) as a function of the LED marker coordinates from "Decoded LED marker IDs with location" block 220 (see FIG. 2A). The process continues with "For each projector pixel" step 402 by iterating for each pixel of a projector the following steps. The process continues at "Compute input pixel at current projector pixel UV coordinates" step 403 by computing the input pixel value at the current projector pixel UV coordinates obtained from "Input frame" block 304. The process continues at "Linearize" step 404 by linearizing the input frame pixel (RGB red green blue). This step 404 receives as input the "Source intensity transfer function" block 301*a* and cancels the intensity transfer function with the inverse intensity transfer function. The process continues at "White balance correction" step 405 by applying a white balance correction with the correction coefficients of the three primary colors RGB from "Projector white balance corrections" block 117 (see FIG. 1A). In the case of projectors with built in color correction function, the white balance correction is not applied in the Shader. The process continues at "RGB to xyY CIE 1930" step 406 by converting the value of the pixel of RGB (red green blue) color space to the CIE-xyY 1930 color space by using the target gamut. In the case of projectors with built in color correction functions, the target gamut is directly set in the projector settings and the Shader uses a default gamut (e.g. sRGB, Rec. 709, Rec. 2020, SMPTE-C, etc.) for color space conversion. The process continues at "Apply blending parameters to the blending value" step 407, which adapts the value of the blending of the pixel of "Blending map texture value at projector pixel xy coordinates" block 115 as a function of the blending parameters of block 301*c* (see FIG. 3). The process continues at "Apply luminance intensity correction on Y channel step 408, involving the multiplication of the value of the blending pixel from step 407 with the value of the attenuation of the pixel from block 116 (see FIG. 1A) and the value of the luminance of the pixel in the frame from step 406. The process continues at "xyY CIE 1930 to RGB" step 409 by converting the value of the pixel in the CIE-xyY 1930 color space to the RGB (red blue green) color space by using the measured projector gamut. In the case of projectors with built in color correction functions, the measured projector gamut is directly set in the projector settings and the Shader use a default gamut (e.g. sRGB, Rec. 709, Rec. 2020, SMPTE-C, etc.) for color space conversion. The process continues at "Delinearize" step 410 by delinearizing the result from step 409. This step 410 is achieved by applying the target intensity transfer function of block 301*b* (see FIG. 3) to the RGB (red green blue) components of the pixel. This step 410 also uses as input the measured projector intensity transfer function 118 (see FIG. 1A). The process continues at "Corrected pixel" step 411 by receiving and storing the result of step 410. The value RGB of the corrected pixel is to be projected by the projector. The process continues at "More pixels?" block 412 by verifying whether there are more pixels or not. If yes, the process loops back to step 402. If not, the process continues to "Corrected projector image" block 308 (see FIG. 3) and ends at "End" step 413.

Figure 5A:
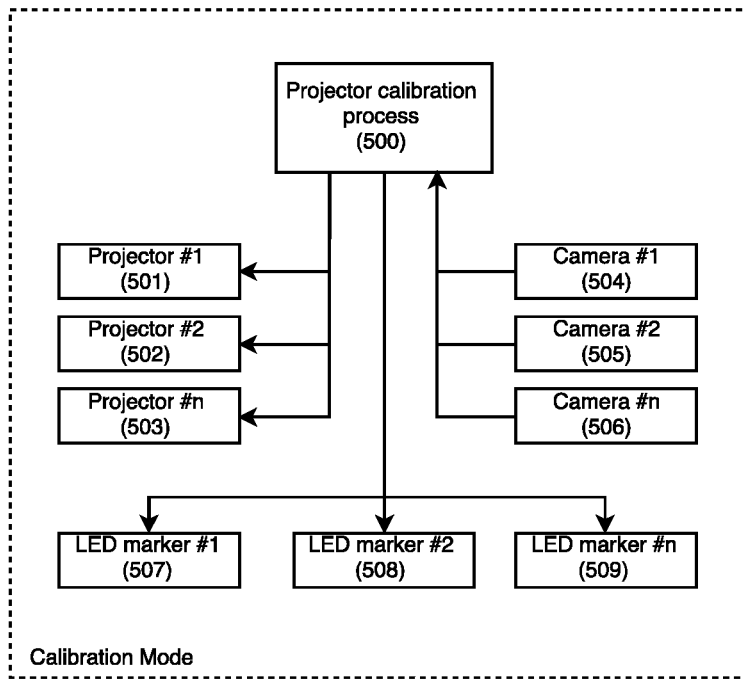
FIG. 5A is a block diagram of the hardware used in a projector calibration process in a calibration mode, in accordance with an illustrative embodiment of the present invention.

Referring to FIG. 5A, there is illustrated the hardware used in "Projector calibration process" block 500 in a calibration mode, in accordance with an illustrative embodiment of the present invention. The hardware includes "Projector #1" at block 501, "Projector #2" at block 502 and "Projector #n" at block 503, which are all linked to the "Projection calibration process" at block 500. The hardware also includes "Camera #1" at block 504, "Camera #2" at block 505 and "Camera #n" at block 506, which are all linked to the "Projection calibration process" at block 500. The hardware also includes "LED marker #1" at block 507, "LED marker #2" at block 508 and "LED marker #n" at block 509, which are all linked to the "Projection calibration process" at block 500.

Figure 5B:
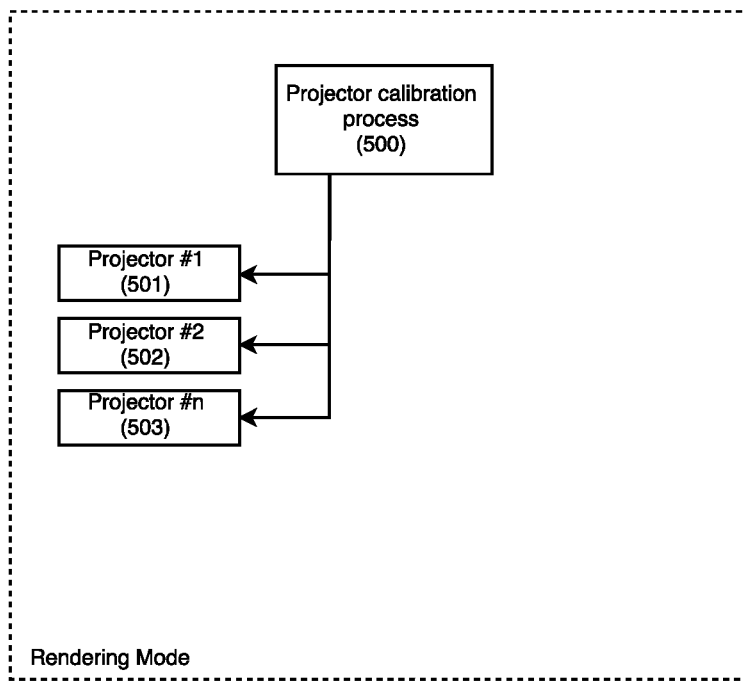
FIG. 5B is a block diagram of the hardware used in a projector calibration process in a rendering mode, in accordance with an illustrative embodiment of the present invention.

Referring to FIG. 5B, there is illustrated the hardware used in a "Projector calibration process" block 500 in a rendering mode, in accordance with an illustrative embodiment of the present invention. The hardware includes "Projector #1" at block 501, "Projector #2" at block 502 and "Projector #n" at block 503, which are all linked to the "Projection calibration process" at block 500.

The display of static two-dimensional images can be improved by the techniques described above, but these same techniques can be applied to the display of real time three dimensional images as well. One approach is to measure the position of the viewer and perform real time parallax correction on the displayed image. This technique could be used, for example, as a way of making a wall display appear as a window into an adjacent room or portion of a room. A full wall display could give the illusion of being part of a single, contiguous, larger space. An outside viewed hemispherical display could appear to be a three-dimensional physical object, viewable from any angle.

Binocular cues could be provided by supplying each eye with a different image. Standard approaches to this problem include frame triggered shutters for each eye, projected polarization control, red/blue colored glasses. Another approach may be to project six colors, using distinct narrow band color filters for each eye.

The scope of the claims should not be limited by the preferred embodiments set forth in the examples, but should be given the broadest interpretation consistent with the description as a whole.

The invention claimed is:

1. A method for automatically calibrating a system of projectors for displaying images, the method comprising the steps of:

selectively projecting pixels of a projector output from at least one projector onto a projection surface;

sensing said pixels of said projector output as projected across said projection surface by at least one sensor, said at least one sensor being displaceable with respect to said projection surface;

deriving a projector/screen mapping based on said selectively projected pixels and said sensed pixels;

deriving a pixel correction function based on said projector/screen mapping;

storing said pixel correction function by applying a texture map to a mapping mesh inside a graphical pipeline of a graphics processor unit (GPU);

applying said pixel correction function to input image pixel data to produce corrected pixel data which corrects at least for misalignment;

driving said projector with said corrected pixel data; and providing at least two active LED markers for sensing a correct position on said projection surface of a final image to display;

wherein said at least two active LED markers sense the correct position on said projection surface of said final image to display by:

turning on in sequence said at least two LED markers;

deriving a sensor/markers positions;

deriving a markers/image mapping; and composing said sensor/markers positions with said markers/image mapping.

2. The method of claim 1, wherein said pixel correction function corrects for misalignment of plural projections in a common region or for intensity variations across a projected image or for imperfections across a projected image or for chromatic aberration or for rotational distortion or for performing smooth warping of said input image.

3. The method of claim 1, wherein said texture map is applied to said mapping mesh inside said graphical pipeline of said graphics processor unit (GPU) (a) such that part of said pixel correction function is applied to said pixel data either between said graphical pipeline and said projector or directly in said projector or (b) such that said projector is driven from said corrected pixel data in said graphical pipeline.

4. The method of claim 1, wherein a plurality of projectors is provided, each of said projectors comprising a portion of said texture map in each of said projectors' said graphical pipeline or wherein a separate texture map is provided for each plural color or wherein said projector output is sensed by an optical sensor that is displaced from said projection surface or wherein said optical sensor comprises at least one camera.

5. The method of claim 4, wherein said pixel correction function corrects for misalignment of overlapping pixel array or blends overlapping projection regions.

6. The method of claim 4, wherein the step of deriving said projector/screen mapping comprises the steps of:
   deriving a sensor/screen mapping;
   deriving a projector/sensor mapping; and
   deriving the projector/screen mapping by composing said sensor/screen mapping with said projector/sensor mapping.

7. The method of claim 6, wherein the step of deriving said sensor/screen mapping comprises the steps of:
   projecting a calibration pattern at said projection surface; and
   creating a mapping between pixels in sensor space and projection surface positions by viewing said projected calibration pattern with said optical sensor.

8. The method of claim 7, wherein the step of deriving said projector/sensor mapping comprises the step of selectively driving projector pixels while sensing said projector output.

9. The method of claim 1, wherein said projector output is projected onto a flat surface or a curved surface or an irregular surface.

10. The method of claim 1, further comprising the steps of:
   measuring a position of a viewer; and
   performing real-time parallax correction to image pixel data responsive to said viewer's position.

11. The method of claim 10, further comprising the step of providing a different image for each of said viewer's eyes or further comprising the step of providing frame triggered shutters for each of said viewer's eyes or further comprising the step of providing projected polarization control or further comprising the step of providing red/blue colored glasses or further comprising the steps of:
   projecting plural colors; and
   using distinct narrow band color filters for each of said viewer's eyes.

12. A system for automatically calibrating a set of projectors for displaying images, the system comprising:
   at least one projector for projecting a projector output on a projection surface;
   at least one sensor for sensing said projector output as projected across said projection surface, said at least one sensor being displaceable with respect to said projection surface;
   at least two active LED markers for sensing a correct position on said projection surface of a final image to display; and
   at least one processor configured for:
   determining a projector/screen mapping by selectively driving projector pixels and reading said sensed projector output from said at least one sensor; and
   applying a pixel correction function to input image pixel data to correct at least for misalignment, said at least one processor driving said projector with said corrected pixel data, said pixel correction function mapping between projector coordinate space and screen coordinate space based on said projector/screen mapping,
   wherein said at least two active LED markers sense the correct position on said projection surface of said final image to display by:
   turning on in sequence said at least two LED markers;
   deriving a sensor/markers positions;
   deriving a markers/image mapping; and
   composing said sensor/markers positions with said markers/image mapping.

13. A method for automatically calibrating a system of projectors for displaying images, the method comprising the steps of:
   selectively projecting pixels from at least one projector onto a projection surface;
   sensing said pixels as projected across said projection surface;
   removing detected wrong or mislabeled structured light encoded points;
   deriving a projector/screen mapping based on said selectively projected pixels and the sensed pixels;
   deriving a pixel correction function based on said projector/screen mapping;
   storing said pixel correction function;
   applying said pixel correction function to input image pixel data to produce corrected pixel data which corrects at least for misalignment; and
   driving said projector with said corrected pixel data, wherein the step of removing detected wrong or mislabeled structured light encoded points comprises the steps of: projecting selectively calibration pattern pixels from said projector onto said projection surface; sensing said pattern pixels as projected across said projection surface; detecting wrong or mislabeled structured light encoded points by means of a machine learning process; and correcting or eliminating wrong or mislabeled calibration pattern points in said detected calibration pattern.

14. The method of claim 13, wherein said detected wrong or mislabeled structured light encoded points are removed by means of a machine learning process.

15. The method of claim 13, wherein said projector surface is an irregular surface.

* * * * *